(12) United States Patent
Kawamura

(10) Patent No.: US 9,465,281 B2
(45) Date of Patent: Oct. 11, 2016

(54) LIGHT PROJECTION APPARATUS AND ILLUMINATION APPARATUS USING SAME

(71) Applicant: PANASONIC INTELLECTUAL PROPERTY MANAGEMENT CO., LTD., Osaka (JP)

(72) Inventor: Ryo Kawamura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/744,582

(22) Filed: Jun. 19, 2015

(65) Prior Publication Data

US 2015/0378250 A1 Dec. 31, 2015

(30) Foreign Application Priority Data

Jun. 26, 2014 (JP) ................. 2014-131487

(51) Int. Cl.
| | |
|---|---|
| *H04N 9/31* | (2006.01) |
| *G03B 21/20* | (2006.01) |
| *F21W 131/406* | (2006.01) |
| *F21W 131/405* | (2006.01) |
| *G09F 19/18* | (2006.01) |

(52) U.S. Cl.
CPC ........ *G03B 21/2053* (2013.01); *H04N 9/3194* (2013.01); *F21W 2131/405* (2013.01); *F21W 2131/406* (2013.01); *G03B 21/206* (2013.01); *G09F 19/18* (2013.01)

(58) Field of Classification Search
CPC ............... F21W 2131/405; F21W 2131/406; H04N 9/3194; H04N 9/3191; H04N 9/3188; H04N 9/3185; H04N 9/3182; G03B 21/2053; G03B 21/206; G09F 19/18

See application file for complete search history.

(56) References Cited

U.S. PATENT DOCUMENTS

| | | | | |
|---|---|---|---|---|
| 6,361,173 B1 * | 3/2002 | Vlahos | ........... | G03B 21/14 348/E5.137 |
| 6,454,415 B1 * | 9/2002 | Vlahos | ........... | G03B 21/14 348/14.1 |
| 6,860,604 B1 * | 3/2005 | Vlahos | ........... | G03B 37/04 353/122 |
| 6,945,653 B2 * | 9/2005 | Kobori | ........... | G03B 21/26 345/156 |
| 6,984,039 B2 * | 1/2006 | Agostinelli | ...... | H04N 5/7416 348/E5.139 |
| 7,090,352 B2 * | 8/2006 | Kobori | ........... | G03B 21/26 345/156 |
| 7,165,844 B2 * | 1/2007 | Kobori | ........... | G03B 21/26 345/2.2 |
| 7,284,864 B2 * | 10/2007 | Kobori | ........... | G03B 21/26 345/156 |
| 7,686,460 B2 * | 3/2010 | Holmgren | ....... | G03B 21/14 353/121 |
| 7,907,790 B2 * | 3/2011 | Inazumi | .......... | G09G 3/001 353/30 |
| 7,984,995 B2 * | 7/2011 | Morrison | ........ | G03B 21/14 353/121 |
| 9,217,865 B2 * | 12/2015 | Yamamoto | ....... | F21V 33/00 |

(Continued)

FOREIGN PATENT DOCUMENTS

JP 2012-243665 12/2012

*Primary Examiner* — Bao-Luan Le

(74) *Attorney, Agent, or Firm* — Greenblum & Bernstein, P.L.C.

(57) ABSTRACT

A light projection apparatus includes: a light setting unit to set specifications of lights; an optical data generating unit to generate optical data with the specifications; a projection range setting unit to set projection ranges; an optical correction data generating unit to generate optical correction data by correcting the optical data to project the lights to the projection ranges; a layer specifying unit to classify the optical correction data and specify a priority of layer; and a light drawing unit to generate light drawing data through drawing process on the optical correction data. The apparatus further includes a light projection unit to project the lights with the light drawing data.

14 Claims, 22 Drawing Sheets

(56) References Cited

U.S. PATENT DOCUMENTS

| | | | |
|---|---|---|---|
| 2002/0113950 A1* | 8/2002 | Vlahos | G03B 21/14 353/97 |
| 2004/0165154 A1* | 8/2004 | Kobori | G03B 21/26 353/69 |
| 2004/0246495 A1* | 12/2004 | Abe | G01C 3/08 356/603 |
| 2005/0117132 A1* | 6/2005 | Agostinelli | H04N 5/7416 353/122 |
| 2006/0001836 A1* | 1/2006 | Kobori | G03B 21/26 353/30 |
| 2006/0256294 A1* | 11/2006 | Kobori | G03B 21/26 353/30 |
| 2007/0109500 A1* | 5/2007 | Kobori | G03B 21/26 353/30 |
| 2007/0273842 A1* | 11/2007 | Morrison | G03B 21/14 353/97 |
| 2008/0100806 A1* | 5/2008 | Inazumi | G09G 3/001 353/31 |
| 2008/0106706 A1* | 5/2008 | Holmgren | G03B 21/14 353/121 |
| 2010/0177929 A1* | 7/2010 | Kurtz | G06K 9/00228 382/103 |
| 2010/0182416 A1* | 7/2010 | Holmgren | G03B 21/14 348/77 |
| 2014/0043545 A1* | 2/2014 | Yamamoto | F21V 33/00 348/744 |
| 2015/0123946 A1 | 5/2015 | Kawamura et al. | |
| 2015/0124431 A1 | 5/2015 | Motoya et al. | |

* cited by examiner

LIGHT PROJECTION APPARATUS AND ILLUMINATION APPARATUS USING SAME

CROSS-REFERENCE TO RELATED APPLICATIONS

This application claims priority to Japanese Patent Application No. 2014-131487 filed on Jun. 26, 2014, the entire contents of which are incorporated herein by reference.

TECHNICAL FIELD

The present disclosure relates to a light projection apparatus which projects light onto an object placed in an arbitrary space and an illumination apparatus using the same.

BACKGROUND ART

Conventionally, in the product exhibition in the show window or in the stage production in event facilities, there has been used illumination presentation to attract the attention of customers and audience and strengthen the impression of exhibits and the like by projecting light from an illumination apparatus such as a spotlight onto a projection target object. As the illumination presentation, in addition to varying the light intensity and the projection position, a cocktail beam obtained by combining primary lights such as red, green and blue lights may be projected.

Also, there is known a light projection apparatus which detects a shadow area of an object, corrects the shadow area such that a projection area of a light projection unit matches the shadow area on the back of the object, sets the corrected shadow area as a light projection range, and projects a projection light in a range in which the object is present (see, e.g., Japanese Patent Application Publication No. 2012-243665 (JP2012-243665A)).

However, when each light is irradiated to a specific location by using a plurality of spotlights (e.g., R, G, B and the like) with different emission colors, as shown in FIG. 22A, a light overlapping portion becomes white whenever lights overlap each other, and a presentation effect using the light colors is rather poor. In other words, light cannot be "overwritten" as shown in FIG. 22B.

For example, by using a plurality of spotlights, as shown in FIG. 23A, it is assumed that each of a circular light 10a and an annular light 10b with different light colors is irradiated to a specific location. In this case, at a light overlapping portion, the lights are mixed as shown by an area 10c in FIG. 23B. Therefore, as shown in FIG. 23C, it is difficult to specify a front-back relationship between the lights, i.e., to specify that the light 10a is in front of the light 10b as shown in FIG. 23C, or when the light 10b is in front of the light 10a as shown in FIG. 23D and, thus, it is difficult to enhance the presentation effect by emphasizing the specific light. Further, since a general spotlight irradiates a circular light, which illuminates not only the projection target object, but also the background, attention of customers and the like to the projection target object may be insufficient.

Also, in the light projection apparatus described in JP2012-243665A, it is possible to project a plurality of spot lights by dividing the projection range, but there is no concept of the front-back relationship to determine which light is in front of or behind the other when the spot lights are overlapped. Therefore, similarly to the spotlight, there is a limit to the presentation effect when the lights are overlapped in the projection range.

SUMMARY OF THE INVENTION

In view of the above, the disclosure provides a light projection apparatus having a high presentation effect when illuminating a projection target object using lights having a plurality of specifications, even when projection ranges of the lights overlap each other, and an illumination apparatus using the same.

In accordance with an aspect of the disclosure, there is provided a light projection apparatus for projecting light to an object which is installed in a space. The apparatus includes: a light setting unit configured to set specifications of a plurality of lights; an optical data generating unit configured to generate a plurality of optical data based on the specifications; a projection range setting unit configured to set projection ranges to which the lights are respectively projected; and an optical correction data generating unit configured to generate a plurality of optical correction data by correcting the plurality of the optical data to respectively project the lights to the projection ranges.

The apparatus further includes a layer specifying unit configured to classify the plurality of the optical correction data by a layer and specify a projection priority of each layer; a light drawing unit configured to generate a plurality of light drawing data by performing a drawing process on the plurality of the optical correction data; and a light projection unit configured to project the lights based on the plurality of the light drawing data.

The light drawing unit is configured to perform the drawing process such that a light based on the optical correction data whose projection priority specified by the layer specifying unit is lower is not projected in a projection range of a light based on the optical correction data whose projection priority is higher.

The layer specifying unit may set the projection priority in an order of generating the optical correction data or sets the projection priority oppositely to the order.

The light projection apparatus may further include a layer projection priority changing unit configured to change the projection priority specified by the layer specifying unit.

The light drawing unit is preferably configured to update the drawing process of the optical correction data according to the projection priorities that have been changed by the layer projection priority changing unit.

The light projection apparatus may further include a layer erasing unit configured to erase the optical correction data on a layer basis for the optical correction data specified by the layer specifying unit.

The light projection apparatus may further include an alpha setting unit configured to add transparency data to each of the plurality of the optical correction data generated by the optical correction data generating unit.

The light projection apparatus may further include: a scene storage unit configured to store a scene associating the optical correction data with the projection priority specified by the layer specifying unit as scene storage data; and a scene selection unit configured to select the scene storage data stored in the scene storage unit.

The light drawing unit is preferably configured to update the drawing process based on the scene storage data selected by the scene selection unit.

The light projection apparatus may further includes a scene insertion unit to insert the optical correction data of a new scene into the scene storage data.

The lights may include a light for illumination which is preferably specified by elements including an illuminance, a brightness, a luminous intensity, a luminous flux, a color temperature, and a color rendering property.

The lights may include a light for image which is preferably specified by a moving image, a still image, and an image containing text and a line.

The light projection apparatus may further include a shape drawing input unit configured to draw and input a shape according to a user's operation The projection range setting unit is preferably configured to set the shape inputted through the shape drawing input unit as the projection range.

The projection range setting unit is preferably configured to extend and reduce the shape of the projection range by the shape drawing input unit.

The light projection apparatus may further include a projection boundary correction unit configured to correct a boundary of the projection range according to the user's operation.

The light projection apparatus may further include: an imaging unit configured to image a space including the projection range of the light projection unit as an imaging range; a projection range extraction setting unit configured to set conditions for extracting the projection range; and a discriminating unit configured to discriminate the projection range and a non-projection range other than the projection range by analyzing imaging data generated by the imaging unit according to the conditions set by the projection range extraction setting unit.

The optical correction data generating unit is preferably configured to correct the optical data based on the projection range and the non-projection range discriminated by the discriminating unit.

In accordance with another aspect of the present invention, there is provided an illumination apparatus using the light projection apparatus described above.

In accordance with the aspects of the disclosure, when projection ranges of lights having different specifications overlap each other, since the lights are classified by a layer and drawn in projection priorities, it is possible to project the light having desired characteristics onto a particular projection range, and to enhance a presentation effect when illuminating the projection target object.

BRIEF DESCRIPTION OF THE DRAWINGS

The figures depict one or more implementations in accordance with the present teaching, by way of example only, not by way of limitations. In the figures, like reference numerals refer to the same or similar elements.

DETAILED DESCRIPTION

Figure 1:
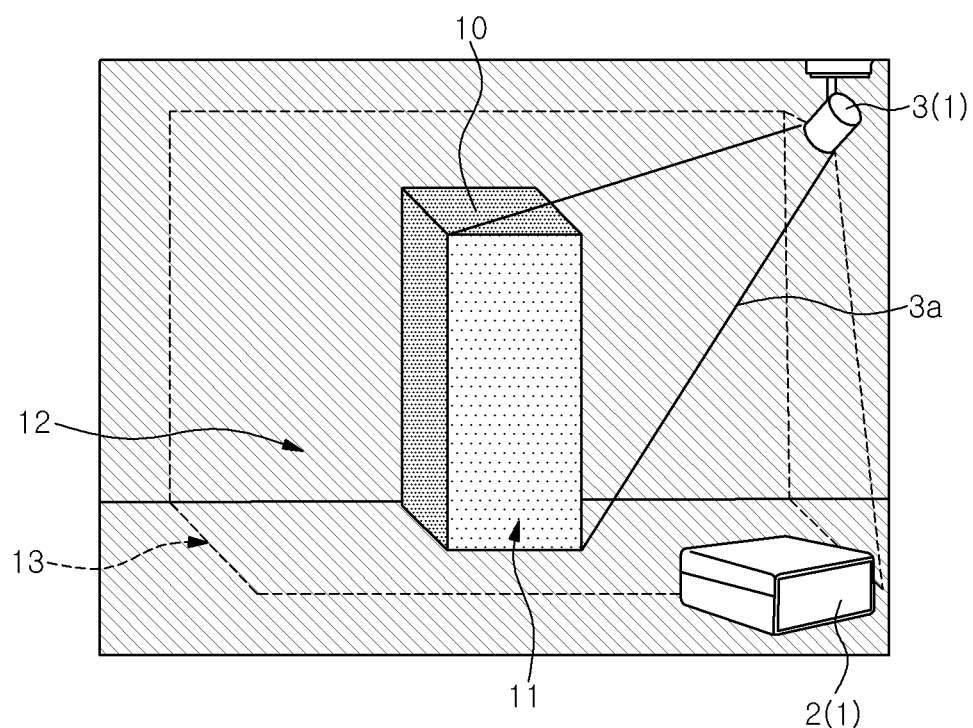
FIG. 1 is a perspective view showing a configuration of a light projection apparatus in accordance with a first embodiment.

A light projection apparatus in accordance with a first embodiment of the disclosure will be described with reference to FIGS. 1 to 5. As shown in FIG. 1, a light projection apparatus 1 in accordance with the present embodiment is used as an illumination apparatus for projecting light to a projection target object 10 which is installed in an arbitrary space. The light projection apparatus 1 includes an illumination control device 2 and a light projection unit (hereinafter, a projector 3) which operates under the control of the illumination control device 2. In the illustrated example, the illumination control device 2 and the projector 3 are provided as separate components, but a part of or the whole configuration of the illumination control device 2 may be incorporated into the projector 3.

The light projection apparatus 1 projects projection light 3a from the projector 3 by a user's operation to brightly illuminate a particular projection range 11 where the projection target object 10 is installed. A projectable range 13 of the projection light 3a projected from the projector 3 includes the projection range 11 in which the projection light 3a is projected and a non-projection range 12 in which the projection light 3a is not projected.

Figure 2:
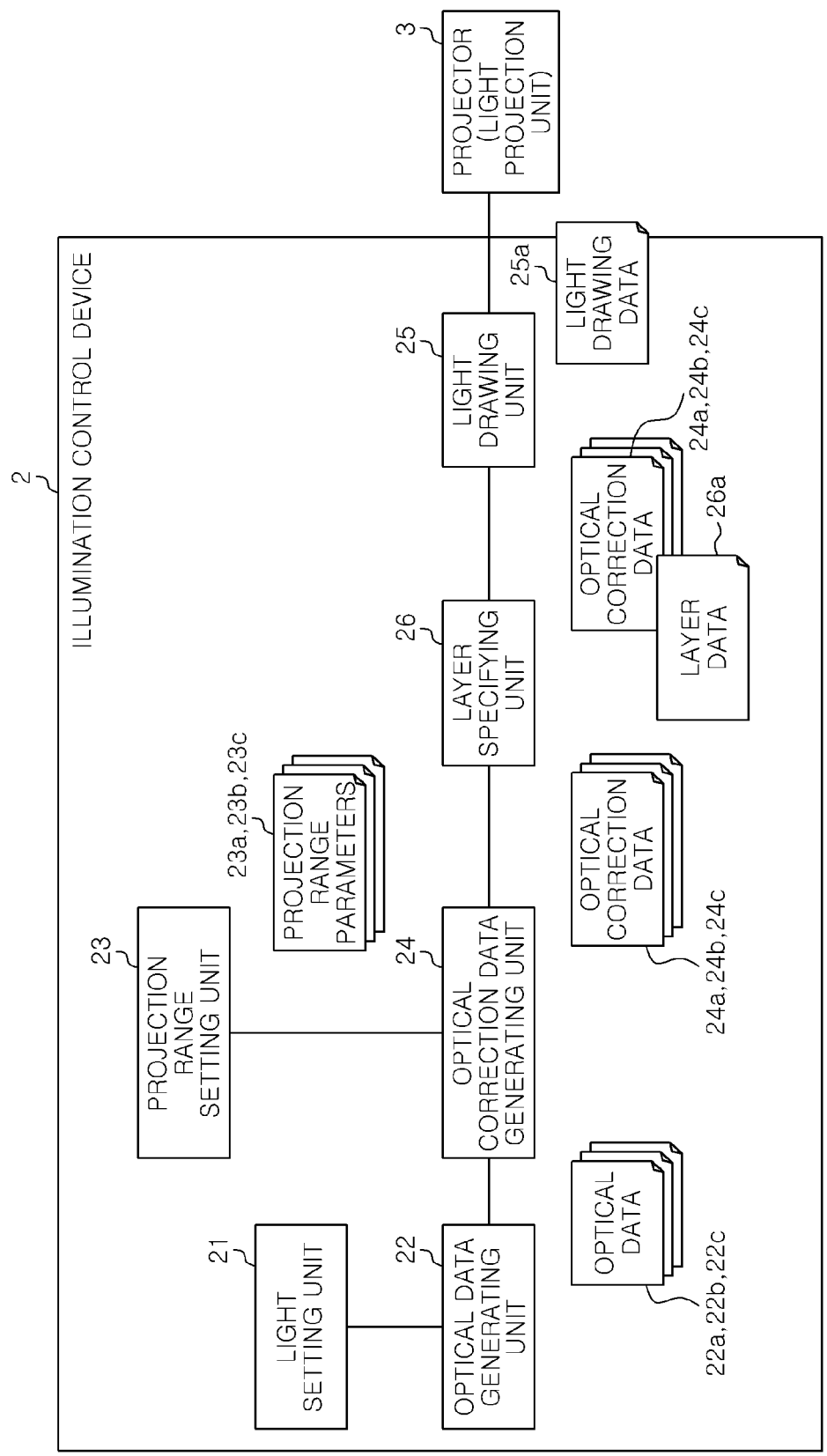
FIG. 2 is a block diagram of the light projection apparatus in accordance with the first embodiment.

As shown in FIG. 2, the illumination control device 2 includes a light setting unit 21 for setting the specifications of a plurality of projection lights 3a, and an optical data generating unit 22 for generating a plurality of optical data (e.g., optical data 22a, 22b and 22c (collectively, optical data 22a and the like)) with the specifications set by the light setting unit 21. Further, the illumination control device 2 includes a projection range setting unit 23 for setting a projection range 11 and the non-projection range 12, and an optical correction data generating unit 24 for generating optical correction data 24a, 24b and 24c by correcting the optical data 22a and the like to project light to the projection range 11 set by the projection range setting unit 23. Further, the illumination control device 2 includes a light drawing unit 25 for generating a plurality of light drawing data 25a by performing a drawing process of the optical correction data 24a and the like which are generated in the optical correction data generating unit 24. The projector 3 (light projection unit) projects the projection light 3a by using the light drawing data 25a generated by the light drawing unit 25.

The light setting unit 21 is a device for inputting user's operation information to set the specifications of the plurality of projection lights 3a according to the user's operation. The light setting unit 21 includes, for example, a tablet system having a liquid crystal touch panel, a pointing device such as a mouse or a dedicated remote controller.

The optical data generating unit 22 includes a flash memory which stores various kinds of optical data 22a and the like, a hard disk device, and a reproducing device for reproducing the information medium of a DVD which records various kinds of optical data 22a and the like. The optical data generating unit 22 supplies the optical data 22a with the specifications set by the light setting unit 21 according to the user's operation to the optical correction data generating unit 24.

Further, the optical data generating unit 22 sets characteristic information to specify the projection light 3a which is projected to the projection range 11, and the non-projection range 12 in which the projection light 3a is not projected. If the projection light 3a includes a light for illumination, the light for illumination is specified by elements including, as the characteristic information, the illuminance, brightness, luminous intensity, luminous flux, color temperature, and color rendering properties. Further, if the projection light 3a includes light for image, the light for image is specified by a moving image, a still image, and an image containing text and lines. The optical data generating unit 22 generates the optical data 22a and the like which are specified by the characteristic information, and outputs the optical data to the optical correction data generating unit 24.

The projection range setting unit 23 includes a memory which stores projection range parameters 23a, 23b and 23c specifying the projection range 11 and the non-projection range 12. The projection range parameter 23a and the like are data representing the projection range 11 in which the projection light 3a is projected or the non-projection range 12 by the coordinates in the projectable range 13 of the projector 3. The projection range setting unit 23 supplies, as necessary, the projection range parameter 23a and the like, which are generated in advance, to the optical correction data generating unit 24.

The optical correction data generating unit 24, based on the optical data 22a and the like which are supplied from the optical data generating unit 22, sets the projection range 11 by using the projection range parameter 23a and the like supplied from the projection range setting unit 23 and sets a range obtained by excluding the projection range 11 from the projectable range 13 as the non-projection range 12. Specifically, the optical correction data generating unit 24 performs a trimming process on the optical data 22a in order to set the projection range 11.

That is, the optical correction data generating unit 24 sets a part of the projection light 3a corresponding to the projection range 11 to have the color and brightness of the projection light 3a determined by the optical data generating unit 22. Further, the optical correction data generating unit 24 sets a part of the projection light 3a corresponding to the non-projection range 12 other than the projection range 11 to have the color and brightness (e.g., black, 0 cd/m$^2$) of the non-projection light determined by the optical data generating unit 22. The correction data of the optical data 22a that is generated in this way is supplied to the light drawing unit 25 as the optical correction data 24a and the like.

The light drawing unit 25 generates the light drawing data 25a by performing a drawing process using the optical correction data 24a and the like which are supplied from the optical correction data generating unit 24. Then, the light drawing unit 25 outputs the light drawing data 25a from the illumination control device 2 to the projector 3, and the projection light 3a is projected from the projector 3.

As the projector 3, a general-purpose liquid crystal projector, DLP (Digital Light Processing) projector or the like is used appropriately. As a light source of the projector 3, a general metal halide lamp, LED, laser or the like is preferably used. The illumination control device 2 and the projector 3 can communicate control signals with each other in a wired or wireless manner, and include, e.g., wiring connection terminals conforming to HDMI (registered trademark), an LAN system conforming to 100base-t, a wireless LAN conforming to IEEE 802.11 and the like.

According to the light projection apparatus 1, by determining in advance the projection range 11 in which a bright light is desired to be projected, it is possible to project the projection light 3a which emphasizes the desired projection range 11 in the projectable range 13 by a simple operation of the user. That is, as shown in FIG. 1, the front surface of the projection target object 10 may be set as the projection range 11 and the background (wall) may be set as the non-projection range 12. Accordingly, only by preparing the projection range parameter 23a in advance, the light projection apparatus 1 can set the projection range 11, and can realize a projection operation and setting work of the projection light trimmed in real time.

In the light projection apparatus 1, as shown in FIG. 2, the optical data generating unit 22 outputs the optical data 22a, 22b and 22c for each of a plurality of ranges obtained by dividing the projection range 11 in the projectable range 13. Specifically, the optical data generating unit 22 outputs a plurality of optical data 22a in which, e.g., the illuminance, brightness, luminous intensity, luminous flux, color temperature, and color rendering properties of the projection light, as the characteristics of light, are different. Here, the plurality of optical data 22a and the like of different characteristics may be stored in advance, or may be generated by changing the characteristics by image processing of the optical data generating unit 22.

The projection range setting unit 23 supplies the projection range parameter 23a and the like indicating a plurality of ranges obtained by dividing the projection range 11 to the optical correction data generating unit 24. The optical correction data generating unit 24 generates the optical correction data 24a and the like by correcting the optical data 22a so as to project the light which differs for each of a plurality of projection ranges divided by the projection range parameter 23a and the like.

The illumination control device 2 includes a layer specifying unit 26 which classifies the plurality of optical correction data 24a and the like generated by the optical correction data generating unit 24 by a layer, and specifies projection priority of each layer. That is, the layer specifying unit 26 adds layer data 26a to the optical correction data 24a and the like which are inputted to the light drawing unit 25. The light drawing unit 25 performs a drawing process such that light based on the optical correction data whose projection priority specified by the layer specifying unit 26 is low is not projected in the projection range of light based on the optical correction data whose projection priority is higher.

Figure 3A:
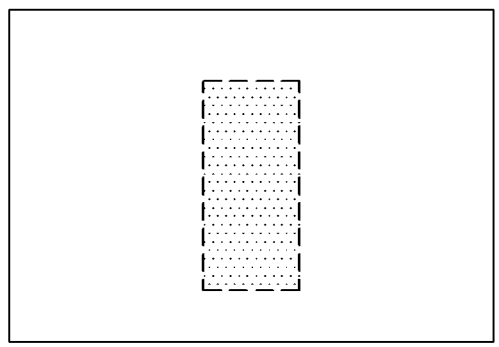
FIGS. 3A to 3C are diagrams showing examples of the optical correction data classified by a layer.
Figure 3B:
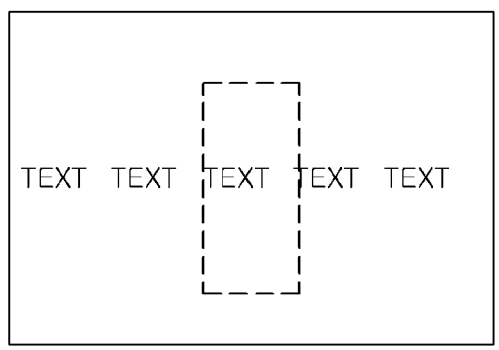
Figure 3C:
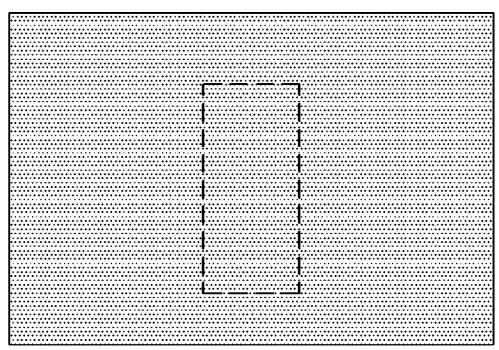

In this case, it is assumed that, as shown in FIGS. 3A to 3C, there are optical correction data 24a, 24b and 24c obtained by correcting three kinds of the optical data 22a, 22b and 22c. Further, dashed lines of FIGS. 3B and 3C are shown to reference the projection range 11a, not the optical correction data 24b and 24c themselves. The optical correction data 24a shown in FIG. 3A includes the front surface of the projection target object 10 set by the projection range parameter 23a as the projection range 11a and includes projecting bright light for illumination as the characteristic information.

The optical correction data 24b shown in FIG. 3B includes a part of the projectable range 13 set by a projection range parameter (not shown) indicating coordinate data different from the projection range parameter 23a as the projection range (projection range 11b). Further, the optical correction data 24b includes projecting light for image (text), which is brighter than the light projected onto the projection range 11c that will be described later and has a different light color, as the characteristic information.

The optical correction data 24c shown in FIG. 3C includes the entire projectable range 13 set by a projection range parameter (not shown) indicating coordinate data different from the above-mentioned projection range parameters as the projection range (projection range 11c). Further, the optical correction data 24c includes projecting light, which is darker than the light projected onto the projection ranges 11a and 11b and has a different light color, as the characteristic information.

Figure 4:
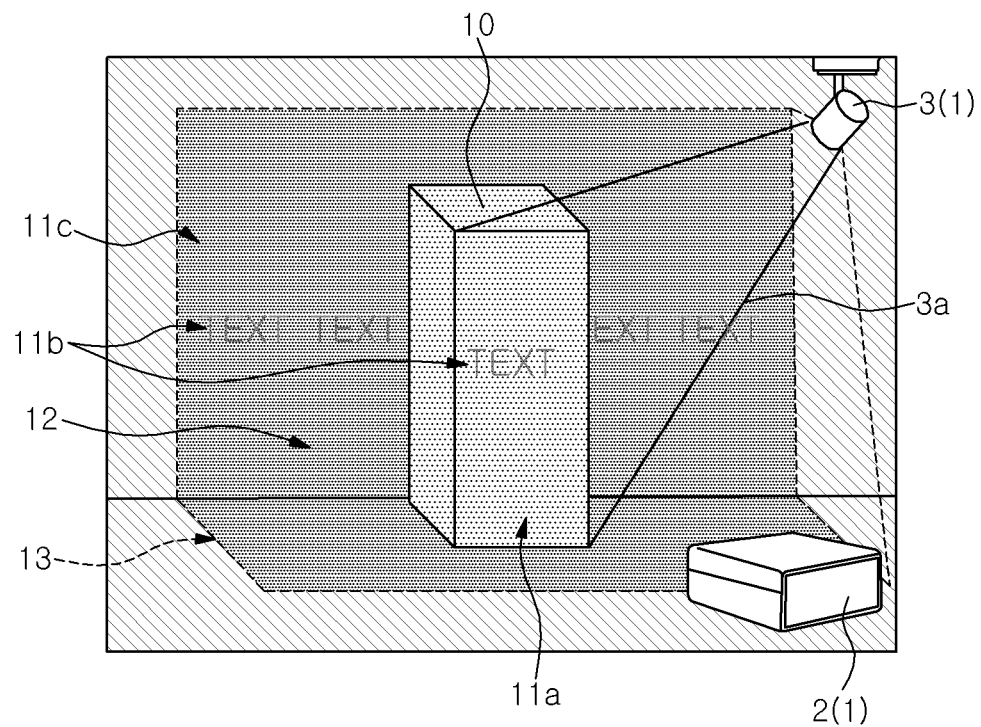
FIG. 4 is a perspective view showing a pattern of projection light in a conventional light projection apparatus.

The projection ranges 11a, 11b and 11c of the optical correction data 24a, 24b and 24c are overlapped in part. Accordingly, in the case of projecting light from the projector 3 based on the light drawing data 25a generated by the light drawing unit 25 performing a drawing process only using the optical correction data 24a, 24b and 24c, as shown in FIG. 4, lights are superimposed on the projection target object 10 present in the overlapping portion of the projection ranges. As a result, the projection target object 10 is not illuminated with a desired light color and brightness, and an illumination presentation effect becomes poor.

In contrast, in the light projection apparatus 1, the layer specifying unit 26 classifies the optical correction data 24a and the like by a layer, and specifies projection priority of each layer. In this case, it is assumed that the layer data 26a with projection priority in order of the optical correction data 24a, the optical correction data 24b and the optical correction data 24c is added to the optical correction data 24a and the like.

The layer specifying unit 26 sets the display order in the order of generating the optical correction data 24a, 24b and 24c. The optical data 22a and the like serving as a base of the optical correction data 24a and the like may be generally set by the user in the order of trying to gather more attention according to the illumination presentation with respect to the projection target object. Therefore, if the layer display order is automatically set in the order of generating the optical correction data 24a, 24b and 24c, it is possible to easily set the order of layers. Further, the layer specifying unit 26 may set the display order oppositely to the order of generating the optical correction data 24a, 24b and 24c.

The light drawing unit 25 performs a drawing process such that the light based on the optical correction data whose projection priority specified by the layer specifying unit 26 is low is not projected in the projection range of the light based on the optical correction data whose projection priority is higher. That is, the light based on the optical correction data 24b and 24c is not projected in the projection range of the light based on the optical correction data 24a, and the light based on the optical correction data 24c is not projected in the projection ranges of the lights based on the optical correction data 24a and 24b. The light drawing unit 25 outputs the light drawing data 25a generated by the drawing processing to the projector 3, and the projector 3 projects light on the basis of the light drawing data 25a.

Figure 5:
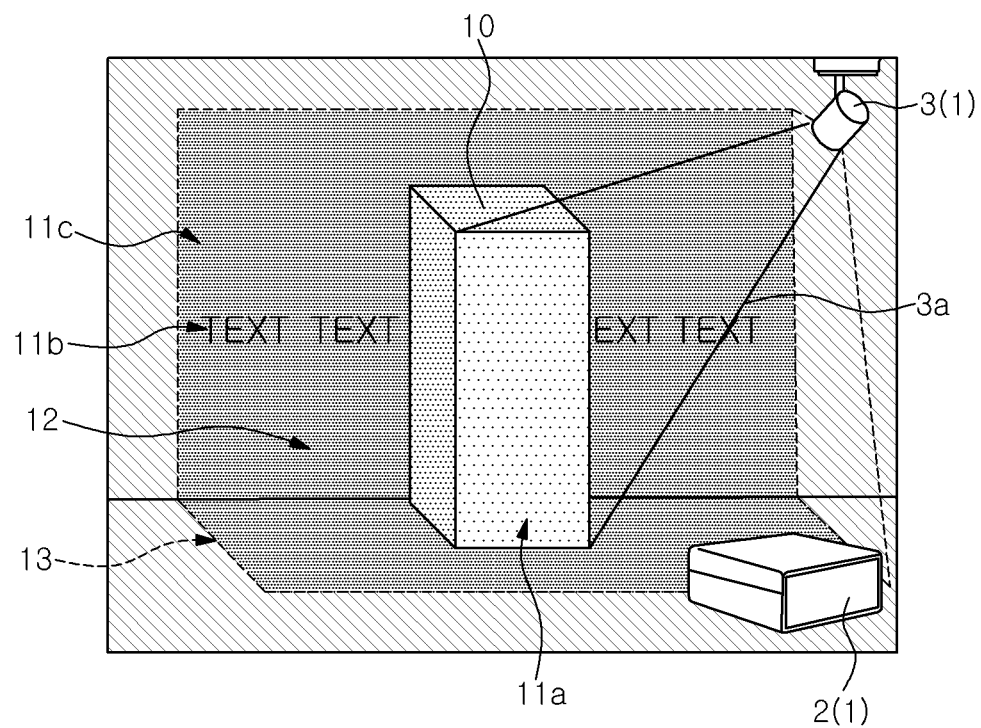
FIG. 5 is a perspective view showing a pattern of projection light in the light projection apparatus of the first embodiment.

As a result, as shown in FIG. 5, only the light based on the optical correction data 24a is projected onto the projection target object 10, and a high illumination presentation effect can be obtained by illuminating the projection target object 10 with a desired light color and brightness. Further, the light based on the optical correction data 24c is projected onto the entire projectable range 13 of the background of the projection target object 10, and the light for displaying characters based on the optical correction data 24b is clearly projected onto a part of the projectable range 13 without being mixed with the light of the background based on the optical correction data 24c.

In other words, in the light projection apparatus 1, when the projection ranges of a plurality of lights having different specifications overlap each other, the lights are classified by a layer, and light drawing is performed in order of projection priority. Accordingly, by illuminating the projection target object 10 with a desired light color and brightness without overlapping the lights of the respective layers. Further, the respective lights are clearly projected without mixing, so that a particular projection range can be illuminated with light having desired characteristics and the presentation effect can be enhanced when illuminating the projection target object. Further, in a conventional spotlight, it is necessary to use a plurality of instruments with different light colors, but in the light projection apparatus 1, it is possible to illuminate a plurality of locations by using one instrument.

Figure 6:
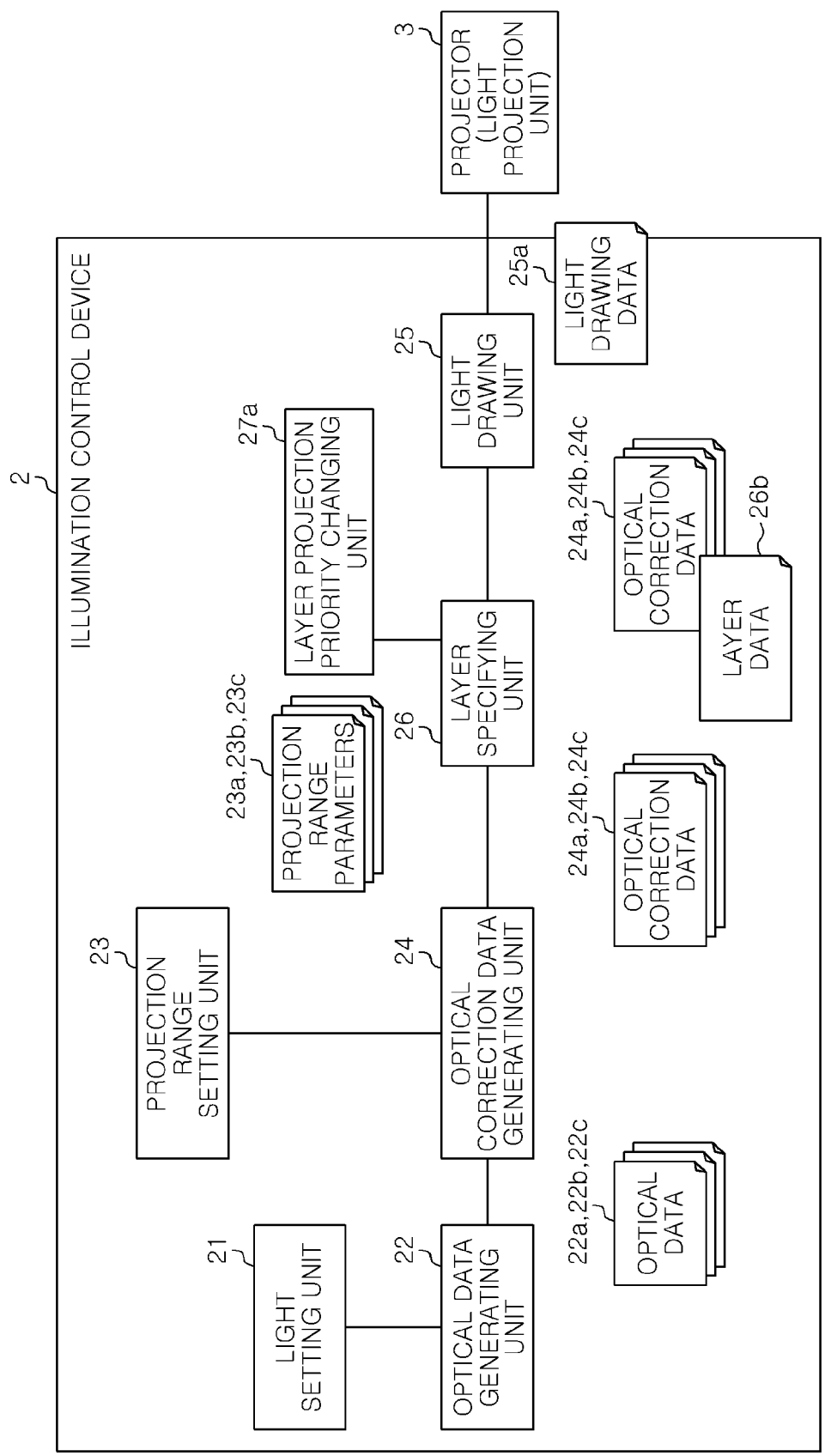
FIG. 6 is a block diagram of a light projection apparatus in accordance with the modification of the first embodiment.

A light projection apparatus in accordance with modifications of the first embodiment will be described with reference to FIGS. 6 to 8. As shown in FIG. 6, the light projection apparatus 1 in accordance with a modification further includes a layer projection priority changing unit 27a for changing the projection priority specified by the layer specifying unit 26. The light drawing unit 25 updates the drawing process of the optical correction data in the projection priorities that have been changed by the layer projection priority changing unit 27a. Similarly to the light setting unit 21, the layer projection priority changing unit 27a is a device for inputting user's operation information, and includes, e.g., a tablet system having a liquid crystal touch panel, or a pointing device such as a mouse.

For example, it is assumed that for three kinds of the optical correction data 24a, 24b and 24c shown in FIGS. 3A to 3C, input information is set by the layer projection priority changing unit 27a such that the projection priority order of those layers becomes the order of the optical correction data 24b, 24a and 24c. In this case, the layer specifying unit 26 outputs layer data 26b containing the input information in addition to the optical correction data 24a, 24b and 24c to the light drawing unit 25.

Figure 7:
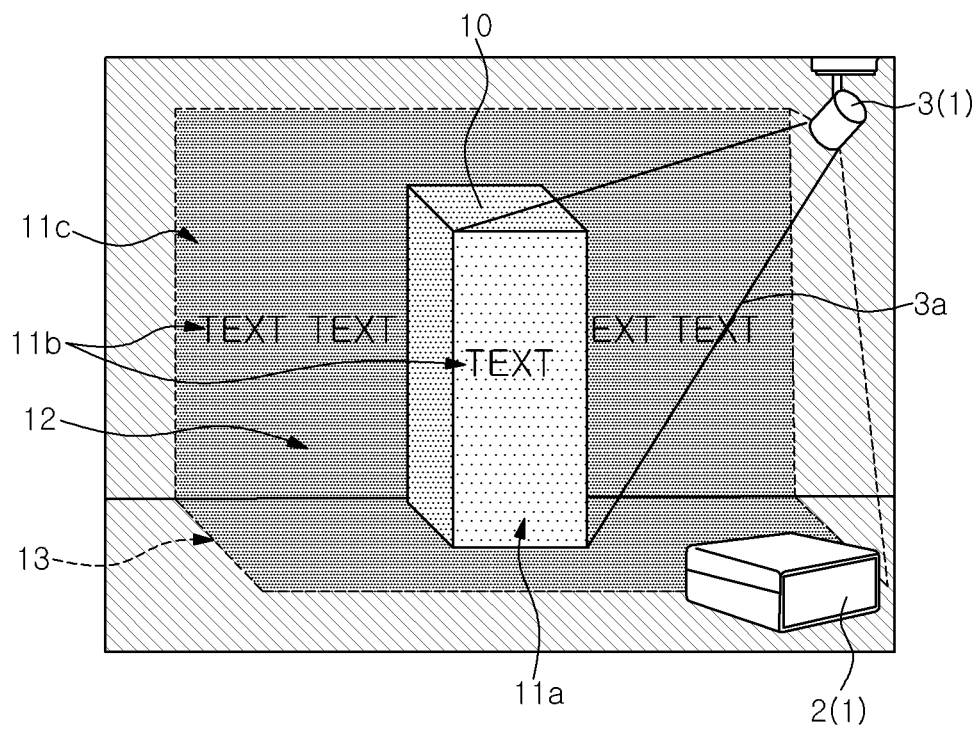
FIG. 7 is a perspective view showing a pattern of projection light in the light projection apparatus of FIG. 6.

As a result, as shown in FIG. 7, a part of the light for displaying characters based on the optical correction data 24b is projected onto the projection target object 10. In this case, since the lights based on the optical correction data 24b and 24a are classified by the layer specifying unit 26, it is possible to clearly project the optical correction data 24b without mixing the lights.

Figure 8:
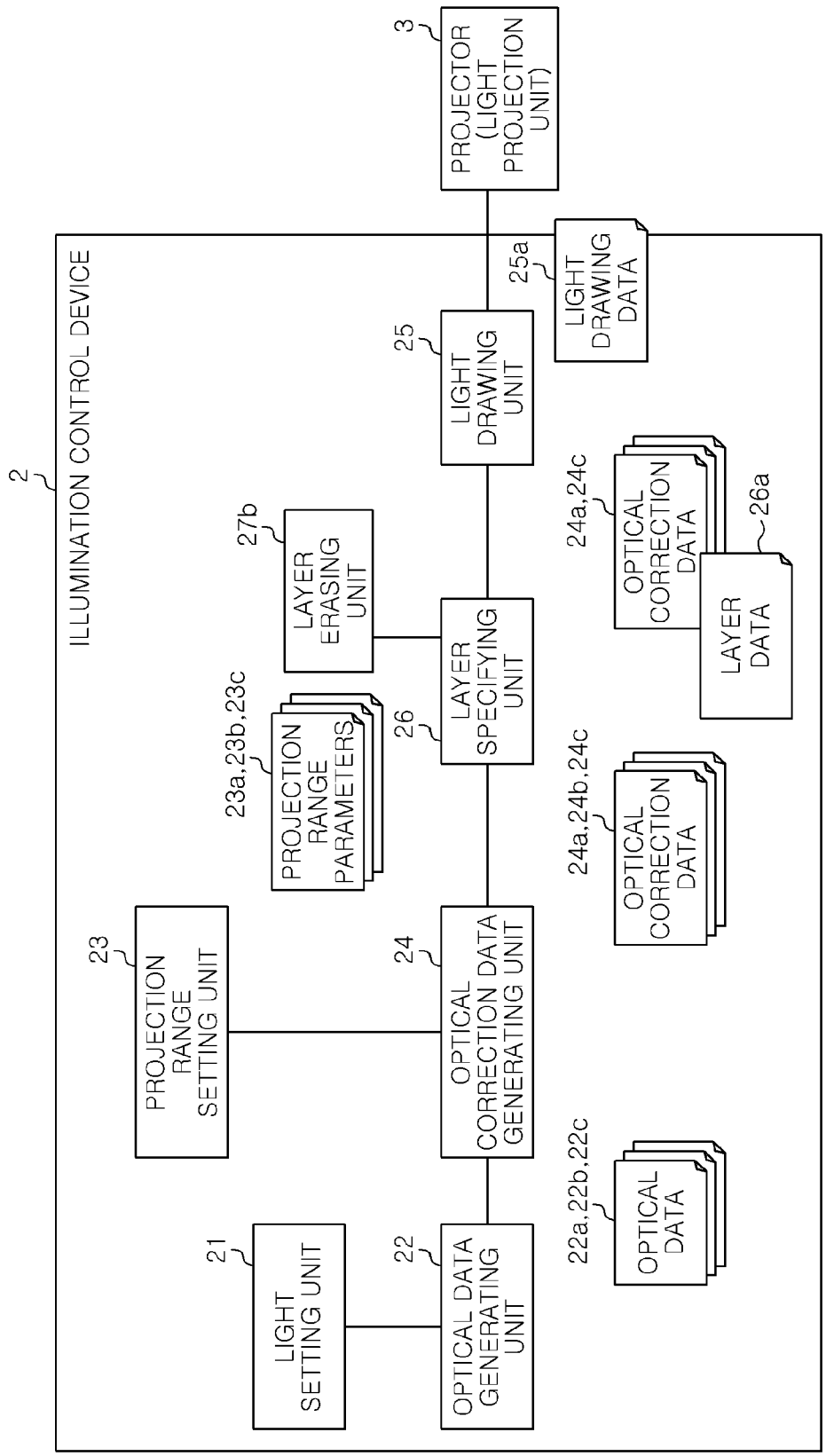
FIG. 8 is a block diagram of a light projection apparatus in accordance with another modification of the first embodiment.

Further, as shown in FIG. 8, the light projection apparatus 1 in accordance with another modification may further include a layer erasing unit 27b for erasing the optical correction data on a layer basis, for the optical correction data 24a, 24b and 24c specified by the layer specifying unit 26. Similarly to the layer projection priority changing unit 27a, the layer erasing unit 27b is also a device for inputting user's operation information, and includes, e.g., a tablet system having a liquid crystal touch panel, or a pointing device such as a mouse.

For example, it is assumed that input information to erase the optical correction data 24b has been set by the layer erasing unit 27b. In this case, the layer specifying unit 26, by referring to the input information, outputs the optical correction data 24a and 24c to the light drawing unit 25.

Figure 9:
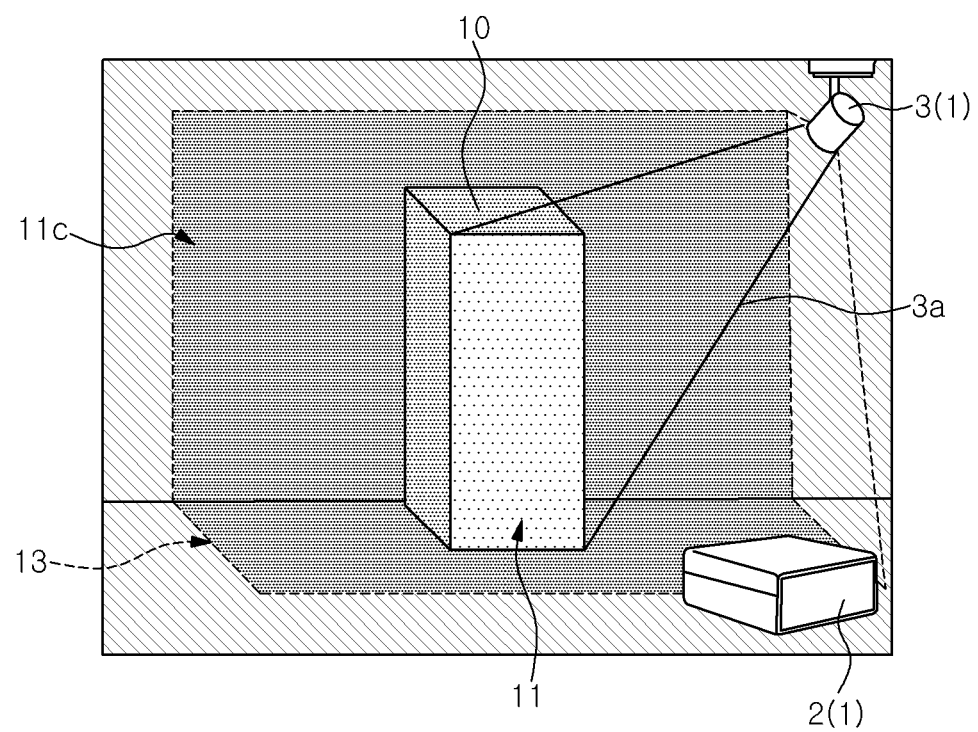
FIG. 9 is a perspective view showing a pattern of projection light in the light projection apparatus of FIG. 8.

As a result, as shown in FIG. 9, the light for displaying characters based on the optical correction data 24b disappears, and only the lights based on the optical correction data 24a and 24c are projected. According to those modifications, the layer relationship that has been set once can be easily changed and erased, and it is possible to simply perform more effective illumination presentation.

Figure 10:
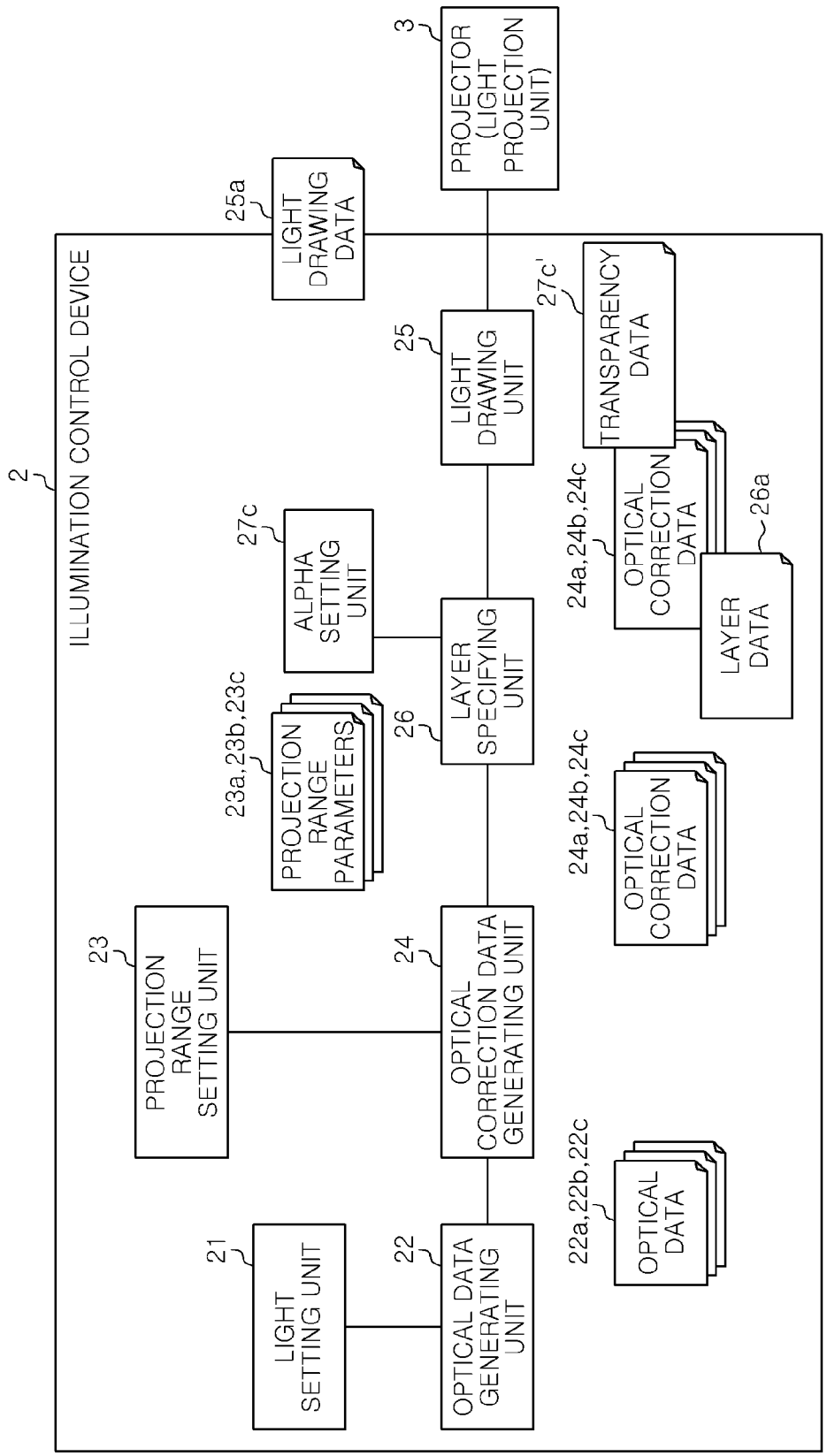
FIG. 10 is a block diagram of a light projection apparatus in accordance with still another modification of the first embodiment.

Further, as shown in FIG. 10, the light projection apparatus 1 in accordance with another modification may further include an alpha setting unit 27c for adding transparency data 27c' to each of a plurality of optical correction data 24a, 24b and 24c generated by the optical correction data generating unit 24. In addition, it is preferable that for one of the optical correction data 24a, 24b and 24c, the transparency data 27c' can be set in relation to the other optical correction data. In the above embodiment, by not overlapping the lights based on the optical correction data 24a, 24b and 24c, the desired light color and brightness set for each light can be achieved, but in some cases, it may be preferable for the illumination presentation that they are slightly overlapped by shading of lights. In other words, in the light projection apparatus 1 in accordance with the present modification, it is possible to apply alpha to the projection light that has been displayed by a layer.

For example, it is assumed that for three kinds of the optical correction data 24a, 24b and 24c shown in FIGS. 3A to 3C, the projection priority order of the layers of the optical correction data 24a, 24b and 24c is set in that order by the layer specifying unit 26. In this case, it is assumed that transparency data 27c' is added by the alpha setting unit 27c such that the transparency of the optical correction data 24a with respect to the optical correction data 24b is 50%.

Figure 11:
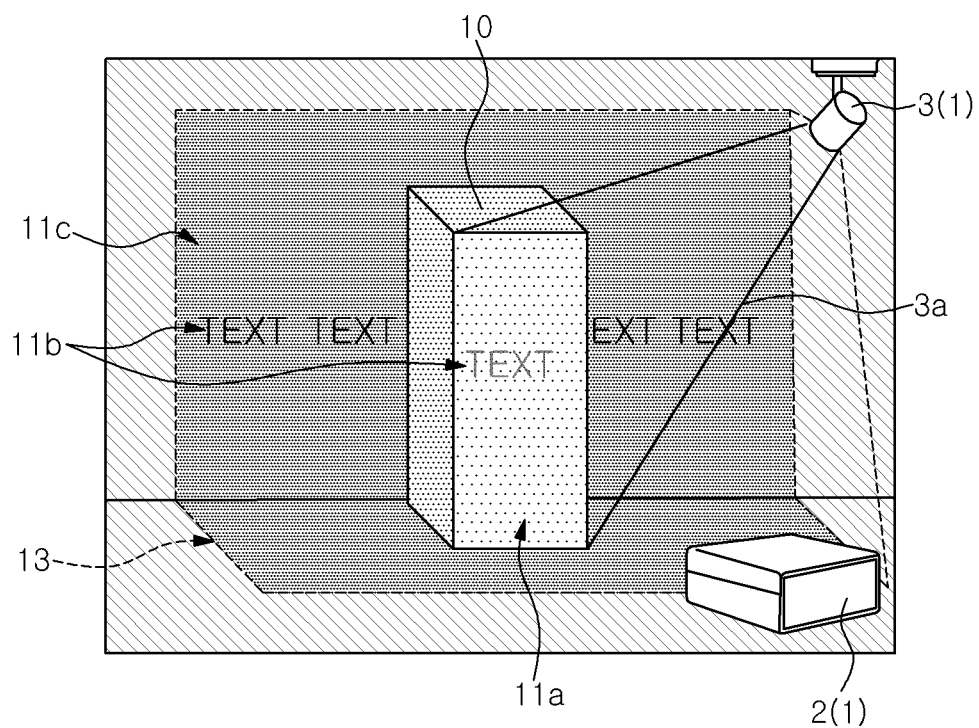
FIG. 11 is a perspective view showing a pattern of projection light in the light projection apparatus of FIG. 10.

In this case, as shown in FIG. 11, the light based on the optical correction data 24b is projected faintly in the projection range 11a of the projection target object 10. In accordance with the present modification, by the user's operation, different projection lights 3a can be superimposed without impairing their optical characteristics. Further, alpha may be applied to only the periphery, not the entire projection range of each projection light.

According to the light projection apparatus 1 of these modifications, the layer relationship that has been set once can be easily changed and erased, and it is possible to simply perform more effective illumination presentation by changing the transparency of each layer.

A light projection apparatus in accordance with a second embodiment of the disclosure will be described with reference to FIGS. 12 and 13. The same reference numerals are assigned to the same components as those of the light projection apparatus 1 in accordance with the first embodiment and modifications described above, and a detailed description thereof will be omitted. This also applies to the embodiments and modifications which will be described below.

Figure 12:
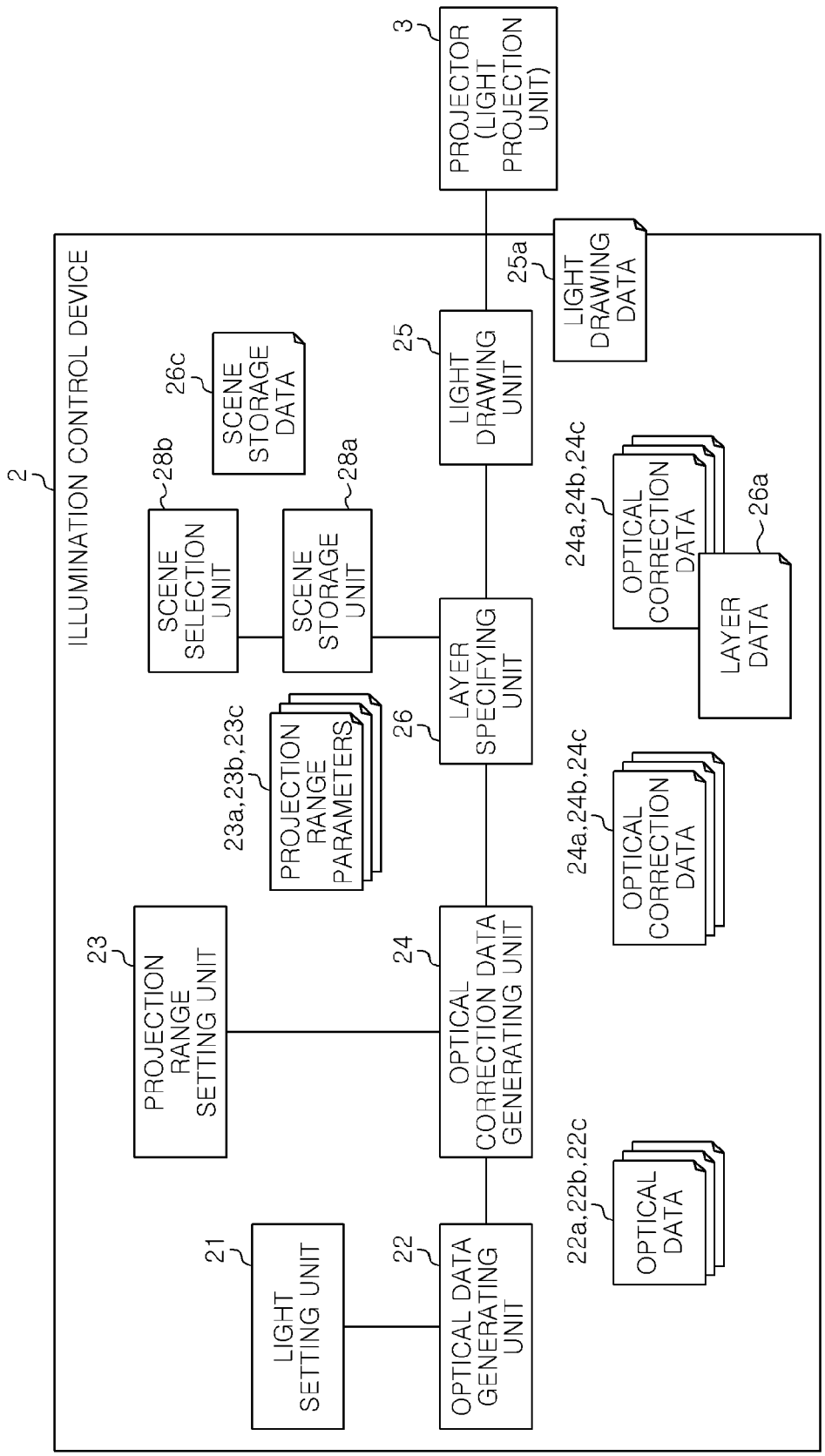
FIG. 12 is a block diagram of a light projection apparatus in accordance with a second embodiment.

As shown in FIG. 12, the light projection apparatus 1 in accordance with the present embodiment further includes a scene storage unit 28a which stores a scene associating the optical correction data with the projection priority (layer data 26a) specified by the layer specifying unit 26 as scene storage data 26c, and a scene selection unit 28b which selects the scene storage data 26c stored in the scene storage unit 28a. The light drawing unit 25 updates the drawing process based on the scene storage data 26c selected by the scene selection unit 28b. The scene storage unit 28a includes a flash memory that stores the scene storage data 26c and a hard disk device. Similarly to the light setting unit 21, the scene selection unit 28b is a device for inputting user's operation information.

For example, a scene (first scene) associating three kinds of optical correction data 24a, 24b and 24c shown in FIGS. 3A to 3C with the projection priority of each layer becomes a light projection pattern as shown in FIG. 5. In the light projection apparatus 1 in accordance with the present embodiment, since the first scene is stored as the scene storage data 26c, it is possible to easily reproduce the first scene only by the user's selection through the scene selection unit 28b without having to re-input the conditions of the first scene.

Figure 13:
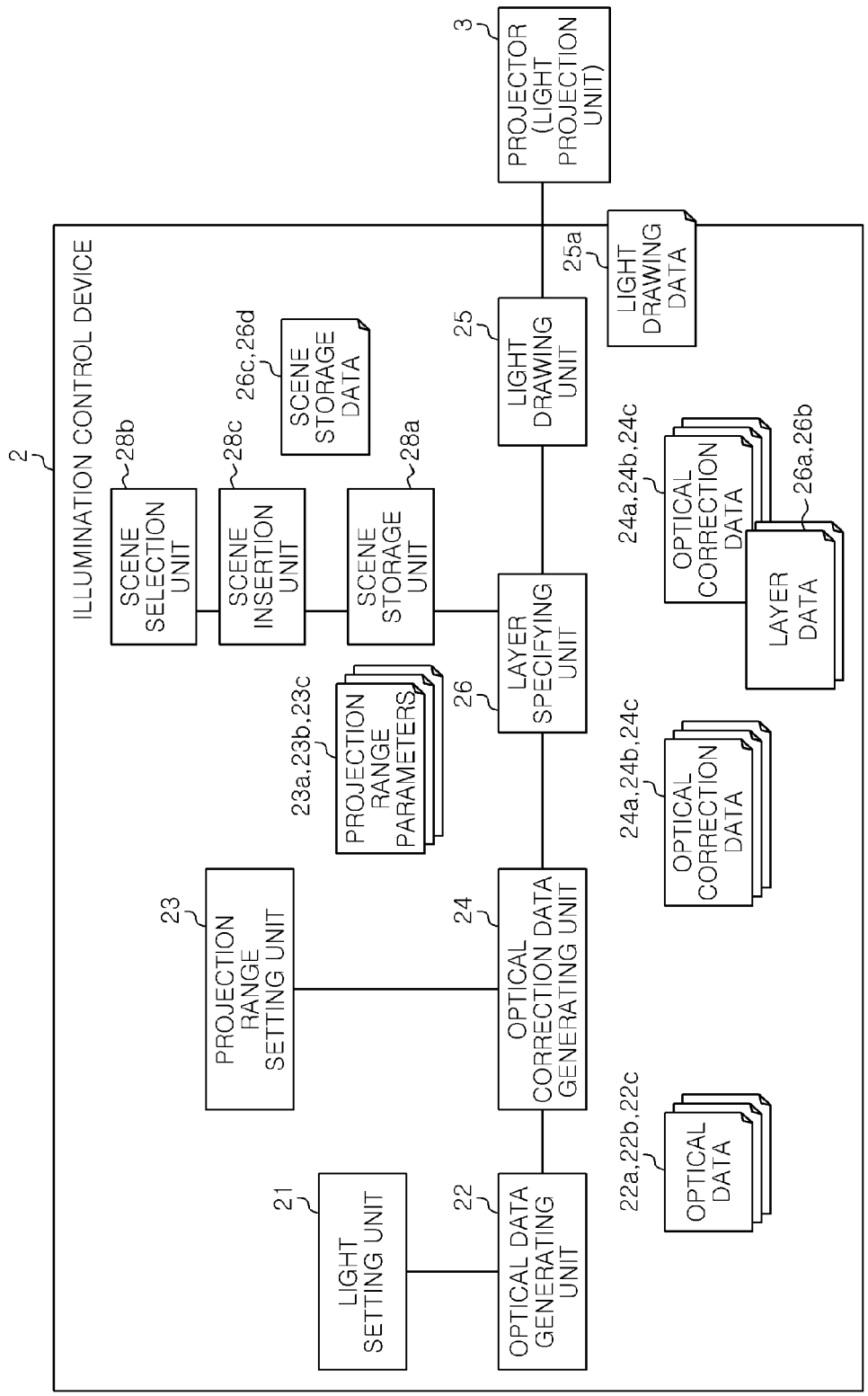
FIG. 13 is a block diagram of a light projection apparatus in accordance with a modification of the second embodiment.

Further, as shown in FIG. 13, the light projection apparatus 1 in accordance with a modification of the second embodiment may further include a scene insertion unit 28c which inserts the optical correction data of a new scene into the scene storage data 26c. That is, the scene storage unit 28a may store a plurality of scenes by the scene insertion unit 28c. For example, if a scene (second scene) associating two kinds of optical correction data 24a and 24c shown in FIGS. 3A and 3C with the projection priority (layer data 26b) of each layer is recorded as scene storage data 26d of the second scene, it is possible to realize a light projection pattern as shown in FIG. 9, and also easily change it to the projection pattern shown in FIG. 5.

Figure 14:
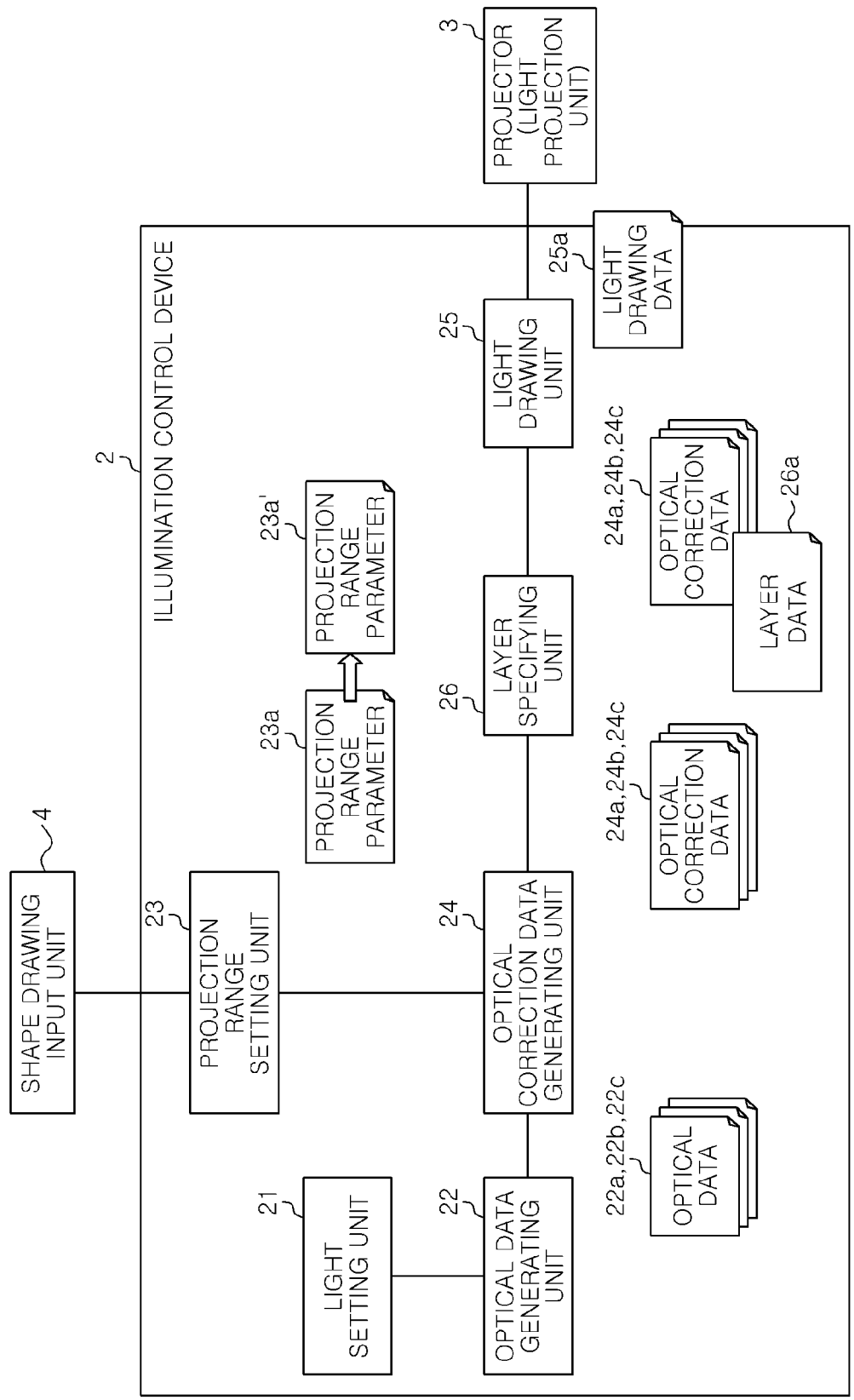
FIG. 14 is a block diagram of a light projection apparatus in accordance with a third embodiment.

Next, a light projection apparatus 1 in accordance with a third embodiment of the disclosure will be described with reference to FIGS. 14 to 17. As shown in FIG. 14, the light projection apparatus 1 in accordance with present embodiment includes a shape drawing input unit 4 for drawing and inputting any shape according to the user's operation, and the projection range setting unit 23 sets the shape inputted through the shape drawing input unit 4 as the projection range 11.

The shape drawing input unit 4, similarly to the light setting unit 21, is a device for inputting user's operation information, and includes, e.g., a tablet system having a liquid crystal touch panel, or a pointing device such as a mouse. In the illustrated example, the shape drawing input unit 4 and the light setting unit 21 are shown as separate components, but they may be the same component.

Figure 15:
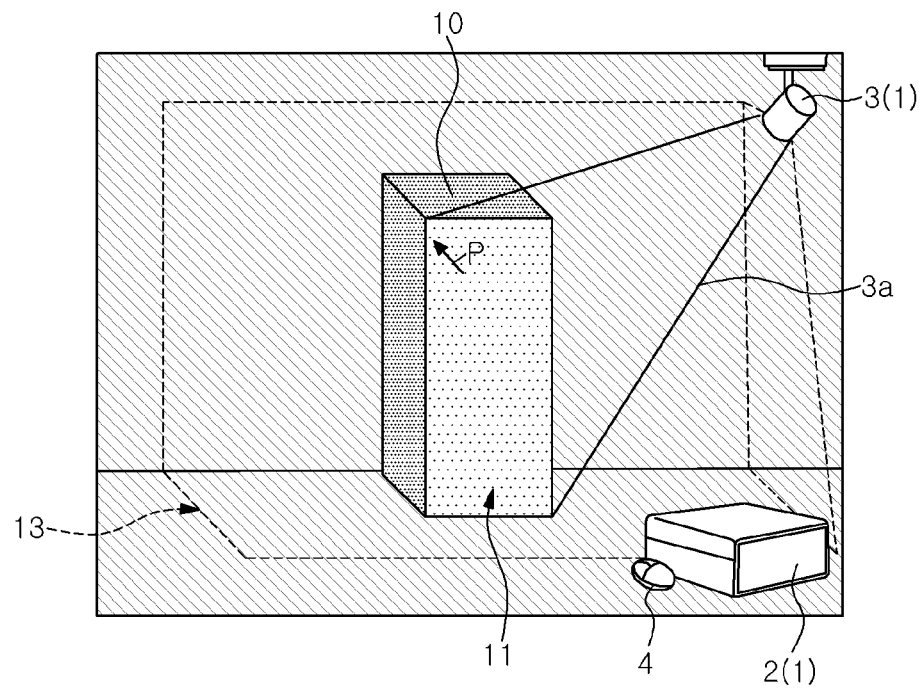
FIG. 15 is a perspective view for explaining the setting procedure of the projection range in the light projection apparatus of the third embodiment.

Here, the optical correction data 24a shown in FIG. 3A is set previously, and an example of changing the projection range parameter 23a of the optical correction data 24a by using the shape drawing input unit 4 is illustrated. As shown in FIG. 15, when the user touches the mouse (shape drawing input unit 4), the illumination control device 2 operates the projector 3 such that a pointer P corresponding to an arbitrary point is displayed in the projectable range 13. That is, when the user operates the mouse, the pointer P is moved in the projectable range 13. In addition, it is preferable that the pointer P is displayed such that the tip of the pointer P in the projection range 11 falls within the contour of the projection range 11.

Figure 16:
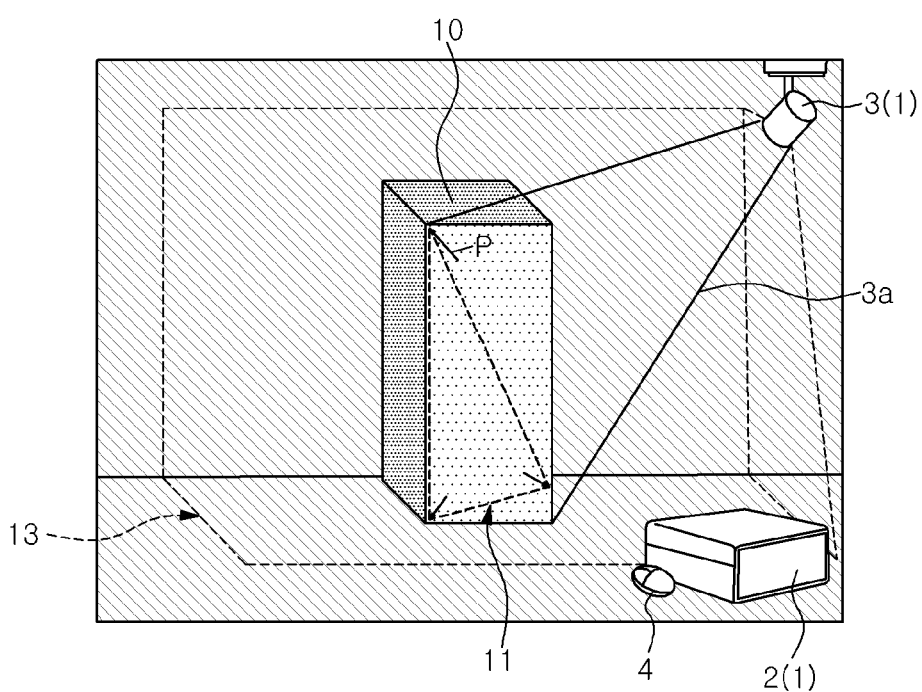
FIG. 16 is a perspective view for explaining the setting procedure of the projection range in the light projection apparatus of the third embodiment.

As shown in FIG. 16, locus information (shown by a dashed line) of the pointer P which is inputted by the shape drawing input unit 4 is converted into a projection range parameter 23a' (see FIG. 14) indicating the contour portion of the projection range (trimming area) by the projector 3. The projection range parameter 23a' is supplied from the projection range setting unit 23 to the optical correction data generating unit 24, and the optical correction data generating unit 24 corrects the optical data 22a based on the projection range parameter 23a'.

Figure 17:
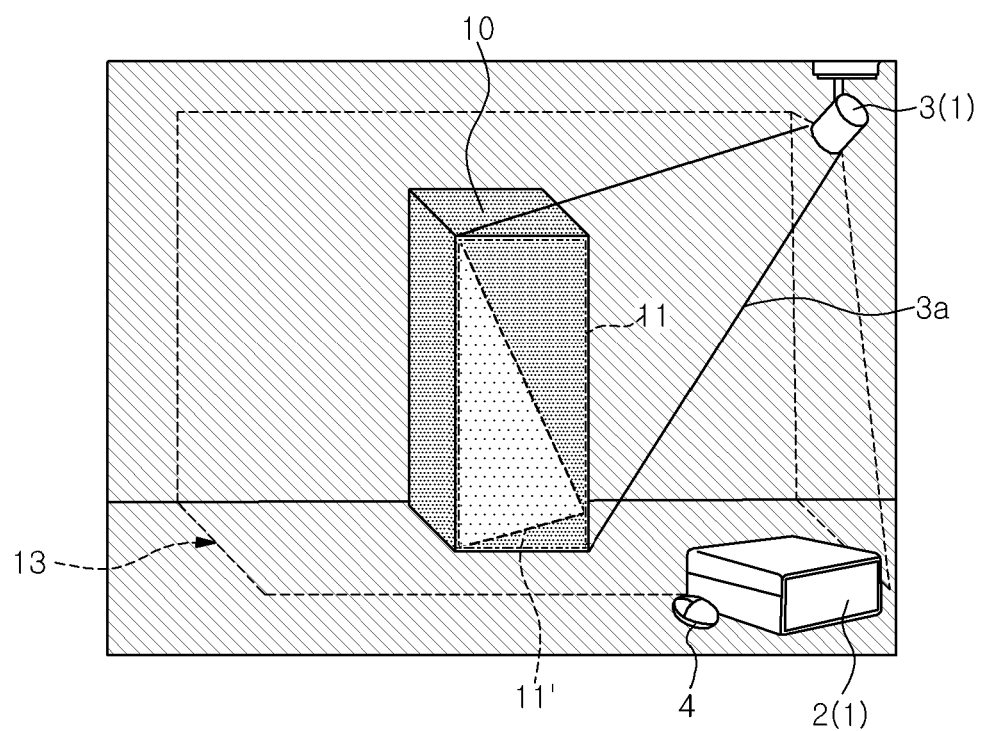
FIG. 17 is a perspective view showing a pattern of projection light in the light projection apparatus of the third embodiment.

Then, as shown in FIG. 17, the light projection apparatus 1 may change an initial projection range 11 (indicated by a dashed dotted line) to a projection range 11' (indicated by a dashed line). Here, a procedure in which the projection range setting unit 23 reduces the shape of the projection range 11 to the projection range 11' through the shape drawing input unit 4 has been described as an example, but the shape of the projection range 11 can also be extended in the same procedure.

Therefore, according to the light projection apparatus 1, only by allowing the user to operate the shape drawing input unit 4 to specify the contour portion of the desired projection range 11, it is possible to project the projection light 3a onto the desired projection range 11 of the projectable range 13. In addition, since the pointer P is displayed in the projectable range 13, it is possible to set the projection range 11 and the like so as to draw a picture on the spot while actually viewing the projectable range 13 in which the projection target object 10 is present, and it is possible to set the projection range and realize the projection and modification work in real time.

In the present embodiment, in addition to changing the optical correction data 24a, by the same procedure as described above, it is possible to generate a new projection range parameter, and the optical data 22a and optical correction data 24a based on it. Also for the optical correction data 24a that has been generated newly, it is possible to set the projection priority by using the layer specifying unit 26. The projection priority of the optical correction data that has been generated newly may be configured automatically to become the highest priority.

Figure 18:
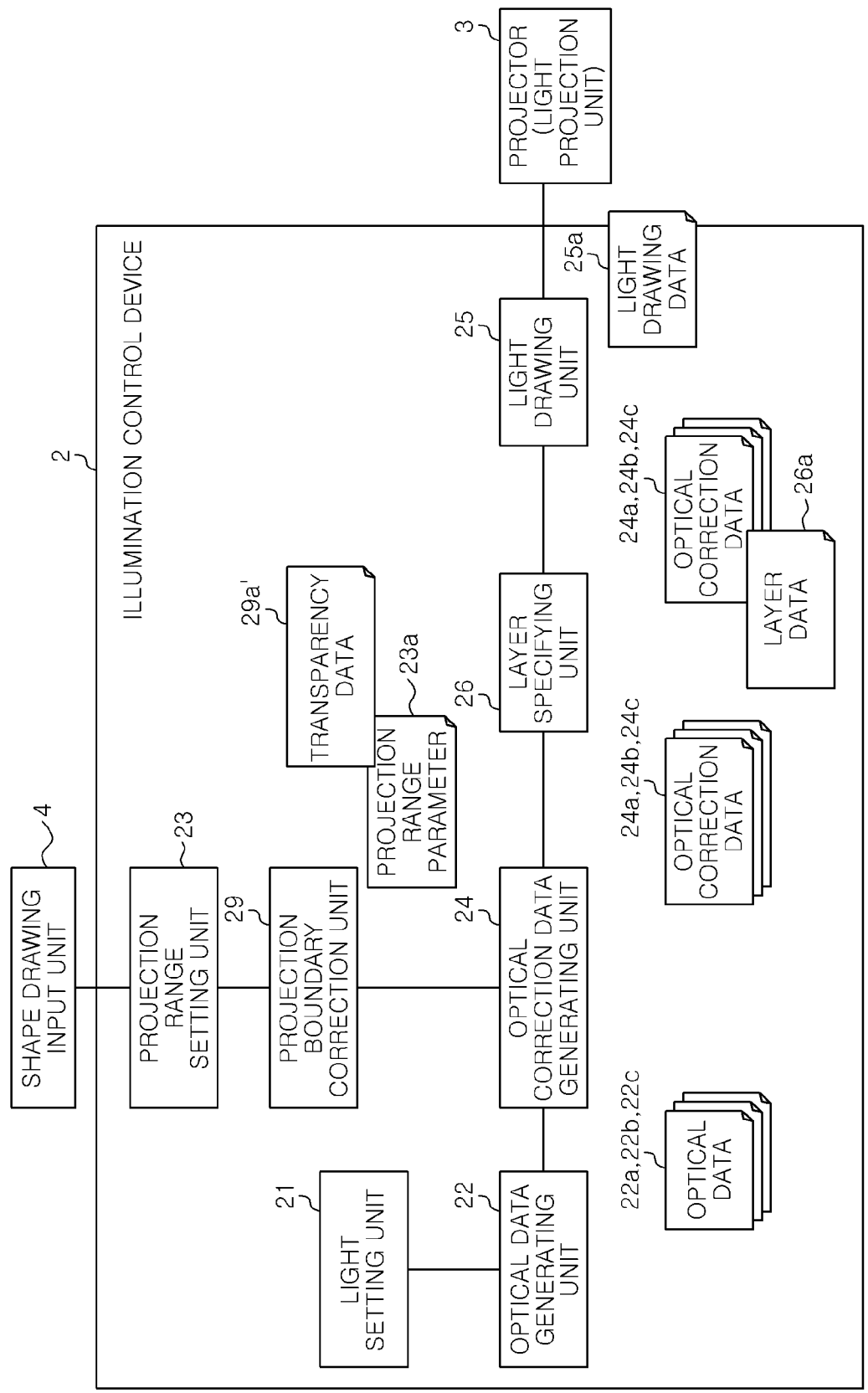
FIG. 18 is a block diagram of a light projection apparatus in accordance with a modification of the third embodiment.
Figure 19:
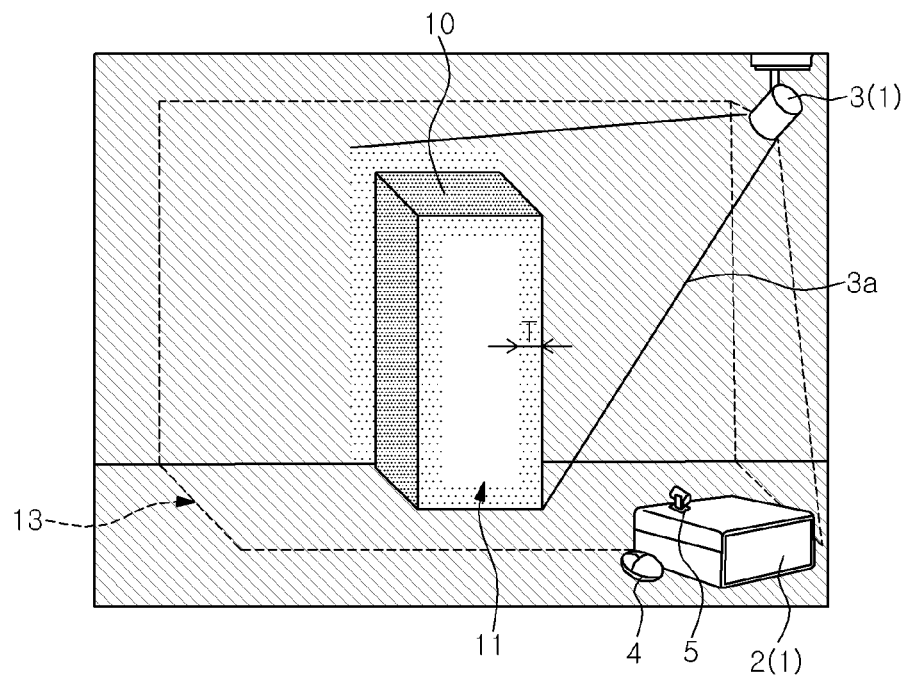
FIG. 19 is a perspective view showing a pattern of projection light in the light projection apparatus.

A light projection apparatus 1 in accordance with a modification of the third embodiment will be described with reference to FIGS. 18 and 19. As shown in FIG. 18, the light projection apparatus 1 in accordance with the present modification includes a projection boundary correction unit for correcting the boundary of the projection range according to the user's operation.

In the light projection apparatus 1 of the modification shown in FIG. 10, the transparency data 27c' is added by the alpha setting unit 27c to each of a plurality of optical correction data generated by the optical correction data generating unit 24. On the other hand, the projection boundary correction unit 29 in accordance with the present modification adds transparency data 29a to the data that defines the boundary of the projection range in the projection range parameter 23a set by the projection range setting unit 23. Thus, as shown in FIG. 19, e.g., at the boundary of the projection range, it is possible to make the light gradually transparent toward the outside from the inside of the projection range in a width T specified by the user. Thus, by applying alpha to the boundary of the projection range, it is possible to make inconspicuous the leakage light in the fine setting of the projection range.

Figure 20:
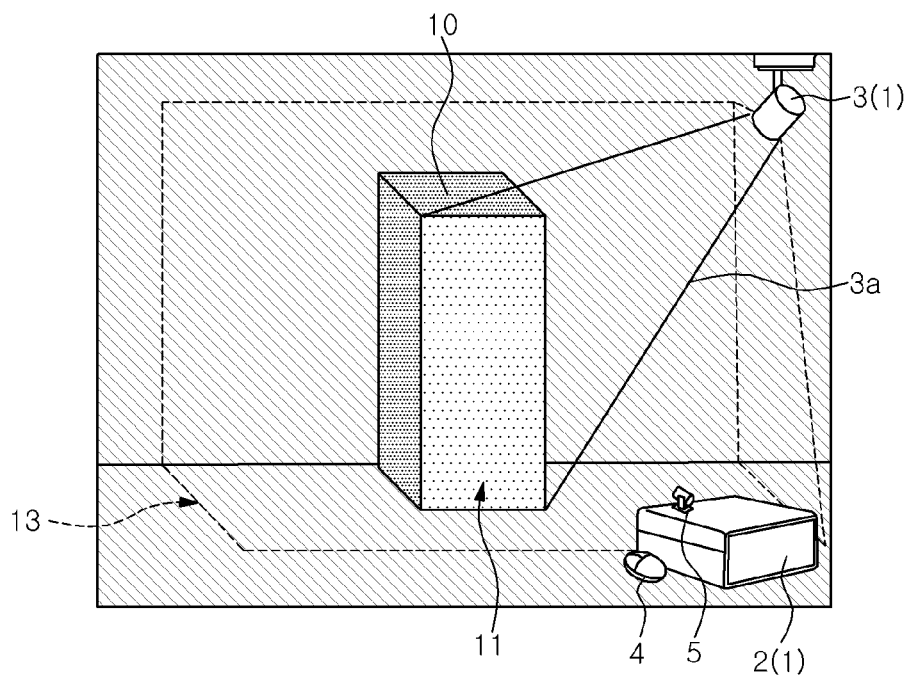
FIG. 20 is a perspective view showing a configuration of a light projection apparatus in accordance with a fourth embodiment.

Next, a light projection apparatus 1 in accordance with a fourth embodiment will be described with reference to FIGS. 20 and 21. As shown in FIG. 20, the light projection apparatus 1 in accordance with the present embodiment includes an imaging unit 5 for imaging a space including the projectable range 13 as an imaging range. The imaging unit 5 is a digital camera for recording and outputting digital data to the outside, and may be a general-purpose Web camera. Also, the imaging unit 5 may be independently present, and may be incorporated in the illumination control device 2 or the projector 3 (light projection unit).

Figure 21:
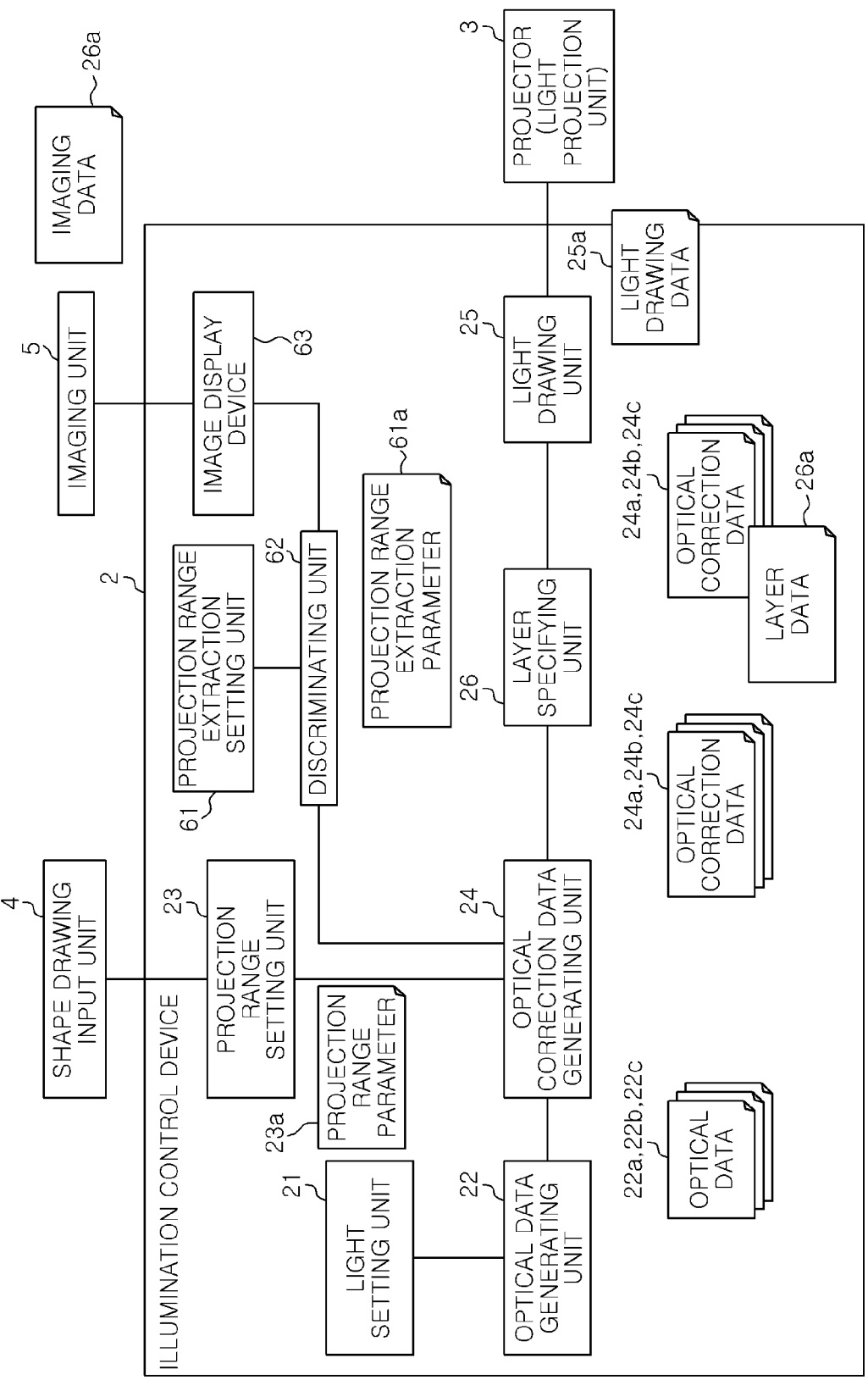
FIG. 21 is a block diagram of the light projection apparatus.
Figure 22A:
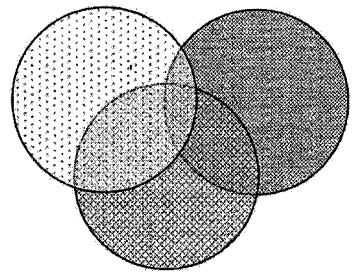
FIGS. 22A and 22B are diagrams respectively illustrating a state where projection lights are overlapped in conventional spotlight illumination, and a state where projection lights are overlapped, which is not achieved in conventional spotlight illumination.
Figure 22B:
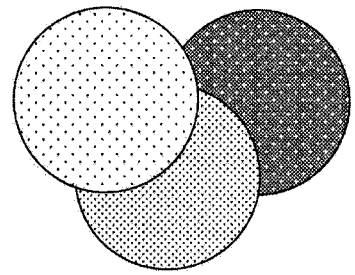
Figure 23A:
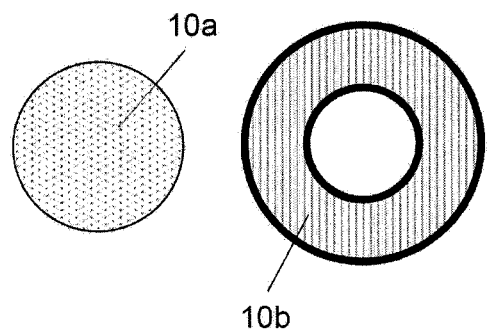
FIGS. 23A and 23B are diagrams illustrating states where projection lights are overlapped in conventional spotlight illumination.
Figure 23B:
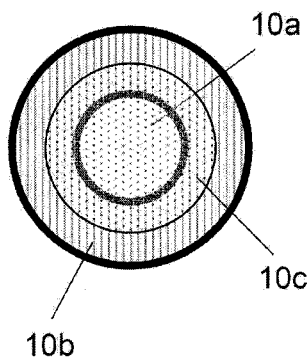
Figure 23C:
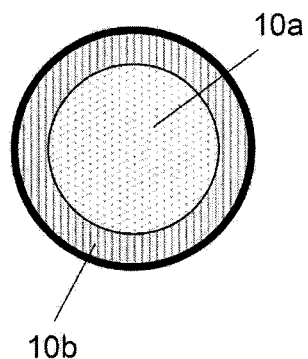
FIGS. 23C and 23D are diagrams showing states where projection lights are overlapped, which are not achieved in conventional spotlight illumination.
Figure 23D:
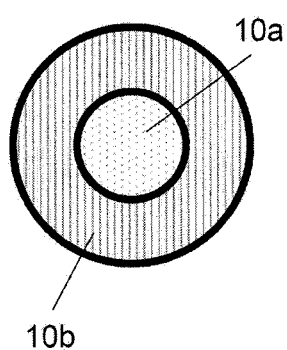

Further, as shown in FIG. 21, the illumination control device 2 further includes a projection range extraction setting unit 61 for setting the conditions of extracting the projection range, and a discriminating unit 62 for discriminating a projection range and a non-projection range other than the projection range. The discriminating unit 62 analyzes imaging data 5a generated by the imaging unit 5 according to the conditions set by the projection range extraction setting unit 61. The optical correction data generating unit 24 corrects the optical data 22a based on the projection range and the non-projection range which are discriminated by the discriminating unit 62.

The projection range extraction setting unit 61 includes a user interface such as a mouse (not shown). The discriminating unit 62 is connected to an image display device 63 for displaying the imaging data 5a generated by the imaging unit 5 and a user interface (not shown) such as a mouse. The image display device 63 is a general-purpose liquid crystal display panel or the like. The extraction conditions of the projection range 11 which are set by the projection range extraction setting unit 61 are supplied to the discriminating unit 62 as a projection range extraction parameter 61a.

The discriminating unit 62 analyzes the imaging data 5a supplied from the imaging unit 5 and extracts a contour of the projection range 11 based on the projection range extraction parameter 61a, e.g., whether or not a difference in color or brightness between adjacent pixels exceeds a threshold value. As a result of the analysis, the discriminating unit 62 supplies a projection range discriminating parameter 62a, as coordinate information indicating a projection range in accordance with the projection range extraction parameter 61a, to the optical correction data generating unit 24. Accordingly, in the light projection apparatus 1, the optical correction data generating unit 24 can generate the optical correction data 24a for projecting the projection light to only the projection range 11 satisfying the extraction conditions set by the projection range extraction setting unit 61.

Specifically, in order to set the projection range 11 for the projection target object 10, the imaging unit 5 generates the imaging data 5a including the projection target object 10 and supplies the imaging data 5a to the image display device 63, and the image display device 63 displays an image including an object image that shows the projection target object 10. Also, when the imaging data 5a is inputted, the discriminating unit 62 analyzes the imaging data 5a based on the projection range extraction parameter 61a, and discriminates the projection range 11 and the non-projection range 12.

The discriminating results of the projection range obtained by the discriminating unit 62 are displayed as contour information on the image display device 63. Further, the projection range discrimination parameter 62a indicating the discriminating results is supplied to the optical correction data generating unit 24.

Thus, in the light projection apparatus 1, the optical correction data generating unit 24 generates the optical correction data 24a based on the projection range parameter 23a and the projection range discrimination parameter 62a, and the light drawing unit 25 and the projector 3 are operated such that the projection light 3a can be projected onto the projection range of an object region. The light projection apparatus 1 generates a plurality of optical correction data (not shown) by the same procedure, and the layer specifying unit 26 sets a layer for each of the optical correction data. Thus, by the user's simple operation, it is possible to automatically generate optical correction data to which the layer data has been added.

It should be noted that the disclosure may be modified in various ways without being limited to the above-described embodiments. For example, as the projector 3, a plurality of projectors may be used. In this case, e.g., lights having different specifications can be respectively projected onto the sides and back of the projection target object 10, and the floor or back or the like which will become the shade and, thus, it is possible to perform the illumination presentation as if the projection target object 10 itself emits light.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A light projection apparatus for projecting light to an object which is installed in a space, comprising:
    a light setting unit configured to set specifications of a plurality of lights;
    an optical data generating unit configured to generate a plurality of optical data based on the specifications;
    a projection range setting unit configured to set projection ranges to which the lights are respectively projected;
    an optical correction data generating unit configured to generate a plurality of optical correction data by correcting the plurality of the optical data to respectively project the lights to the projection ranges;
    a layer specifying unit configured to classify the plurality of the optical correction data by a layer and specify a projection priority of each layer;
    a light drawing unit configured to generate a plurality of light drawing data by performing a drawing process on the plurality of the optical correction data; and
    a light projection unit configured to project the lights based on the plurality of the light drawing data,
    wherein the light drawing unit is configured to perform the drawing process such that a light based on the optical correction data whose projection priority specified by the layer specifying unit is lower is not projected in a projection range of a light based on the optical correction data whose projection priority is higher.

2. The light projection apparatus of claim 1, wherein the layer specifying unit sets the projection priority in an order of generating the optical correction data or sets the projection priority oppositely to the order.

3. The light projection apparatus of claim 1, further comprising a layer projection priority changing unit configured to change the projection priority specified by the layer specifying unit,
    wherein the light drawing unit is configured to update the drawing process of the optical correction data according to the projection priorities that have been changed by the layer projection priority changing unit.

4. The light projection apparatus of claim 1, further comprising a layer erasing unit configured to erase the optical correction data on a layer basis for the optical correction data specified by the layer specifying unit.

5. The light projection apparatus of claim 1, further comprising an alpha setting unit configured to add transparency data to each of the plurality of the optical correction data generated by the optical correction data generating unit.

6. The light projection apparatus of claim 1, further comprising:
    a scene storage unit configured to store a scene associating the optical correction data with the projection priority specified by the layer specifying unit as scene storage data; and
    a scene selection unit configured to select the scene storage data stored in the scene storage unit,
    wherein the light drawing unit is configured to update the drawing process based on the scene storage data selected by the scene selection unit.

7. The light projection apparatus of claim 6, further comprising a scene insertion unit to insert the optical correction data of a new scene into the scene storage data.

8. The light projection apparatus of claim 1, wherein the lights include a light for illumination which is specified by elements including an illuminance, a brightness, a luminous intensity, a luminous flux, a color temperature, and a color rendering property.

9. The light projection apparatus of claim 1, wherein the lights include a light for image which is specified by a moving image, a still image, and an image containing text and a line.

10. The light projection apparatus of claim 1, further comprising a shape drawing input unit configured to draw and input a shape according to a user's operation,
    wherein the projection range setting unit is configured to set the shape inputted through the shape drawing input unit as the projection range.

11. The light projection apparatus of claim 10, wherein the projection range setting unit is configured to extend and reduce the shape of the projection range by the shape drawing input unit.

12. The light projection apparatus of claim 10, further comprising a projection boundary correction unit configured to correct a boundary of the projection range according to the user's operation.

13. The light projection apparatus of claim 10, further comprising:
- an imaging unit configured to image a space including the projection range of the light projection unit as an imaging range;
- a projection range extraction setting unit configured to set conditions for extracting the projection range; and
- a discriminating unit configured to discriminate the projection range and a non-projection range other than the projection range by analyzing imaging data generated by the imaging unit according to the conditions set by the projection range extraction setting unit,
- wherein the optical correction data generating unit is configured to correct the optical data based on the projection range and the non-projection range discriminated by the discriminating unit.

14. An illumination apparatus using the light projection apparatus described in claim 1.

\* \* \* \* \*